United States Patent
Zhao et al.

(10) Patent No.: US 12,492,548 B2
(45) Date of Patent: Dec. 9, 2025

(54) RECONSOLIDATED BAMBOO BEAM-COLUMN JOINT CONNECTED BY SUBASSEMBLY AND DESIGN METHOD

(71) Applicant: Sichuan Provincial Architectural Design And Research Institute Co., Ltd., Chengdu (CN)

(72) Inventors: Shixing Zhao, Chengdu (CN); Qiaoling Zhou, Chengdu (CN); Shuheng Yang, Chengdu (CN); Yuanxu Tang, Chengdu (CN); Ziqin Zhong, Chengdu (CN); Jing Xia, Chengdu (CN); Fei He, Chengdu (CN); Qirui Luo, Chengdu (CN); Dan Lu, Chengdu (CN); Feng Xiong, Chengdu (CN); Ming Zhang, Chengdu (CN); Shuwei Chen, Chengdu (CN); Zhixiang Yu, Chengdu (CN); Jinqiu Qi, Chengdu (CN); Yu Yao, Chengdu (CN)

(73) Assignee: Sichuan Provincial Architectural Design And Research Institute Co., Ltd., Chengdu (CN)

( * ) Notice: Subject to any disclaimer, the term of this patent is extended or adjusted under 35 U.S.C. 154(b) by 287 days.

(21) Appl. No.: 18/234,417

(22) Filed: Aug. 16, 2023

(65) Prior Publication Data
US 2024/0183147 A1 Jun. 6, 2024

Related U.S. Application Data

(63) Continuation of application No. PCT/CN2023/094664, filed on May 17, 2023.

(30) Foreign Application Priority Data

Dec. 1, 2022 (CN) .......................... 202211530547.3

(51) Int. Cl.
 *E04B 1/26* (2006.01)
 *E04C 3/14* (2006.01)

(52) U.S. Cl.
 CPC .............. *E04B 1/2604* (2013.01); *E04C 3/14* (2013.01); *E04B 2001/2644* (2013.01)

(58) Field of Classification Search
 CPC ........... E04B 1/2604; E04B 2001/2644; E04B 2001/2648; E04B 2001/2676; E04B 1/2612; E04C 3/14
 See application file for complete search history.

(56) References Cited

U.S. PATENT DOCUMENTS 5,061,111 A * 10/1991 Hosokawa ................ E04C 3/36
 403/187
5,295,754 A * 3/1994 Kato ........................ E04B 1/26
 403/252

(Continued)

FOREIGN PATENT DOCUMENTS

CN 209989958 U 1/2020
CN 212358606 U 1/2021

(Continued)

OTHER PUBLICATIONS

GB50005-2017, Wood structure standard design, 2017, pp. 4-12, 1-223.

*Primary Examiner* — Theodore V Adamos
(74) *Attorney, Agent, or Firm* — Bayramoglu Law Offices LLC (57) ABSTRACT

A reconsolidated bamboo beam-column joint connected by a subassembly and a design method thereof are provided. Rectangular shear steel plates and vertical steel plates in embedded steel plates form an H-shaped section, and left and right ends of the vertical steel plates are embedded in mortises of a reconsolidated bamboo column and a reconsolidated bamboo beam respectively, thereby effectively (Continued)

improving bearing capacity of the joint. A half tenon is provided with an elliptical bolt hole in a penetrating manner and connected to the reconsolidated bamboo column by a bolt, and the half tenon is rotatable along a center of the elliptical bolt hole and movable along a long axis of the elliptical bolt hole, so that the energy is dissipated through friction between the reconsolidated bamboo half tenon and mortises, excellent energy consumption ability of the half tenon structure is exerted, and the anti-pulling resistance of the tenon is improved.

17 Claims, 7 Drawing Sheets

(56) References Cited

U.S. PATENT DOCUMENTS

| | | | | |
|---|---|---|---|---|
| 5,577,856 | A * | 11/1996 | Tezuka | E04B 1/2604 403/294 |
| 5,617,694 | A * | 4/1997 | Baba | E04B 1/2604 403/174 |
| 5,620,275 | A * | 4/1997 | Novacek | F16B 9/058 403/403 |
| 6,032,431 | A * | 3/2000 | Sugiyama | F16B 9/058 403/258 |
| 11,525,255 | B2 * | 12/2022 | Brekke | E04B 1/2612 |
| 2022/0010547 | A1 * | 1/2022 | Pryor | E04H 9/021 |
| 2023/0332395 | A1 * | 10/2023 | Murphy | E04B 1/2612 |

FOREIGN PATENT DOCUMENTS

| | | | | |
|---|---|---|---|---|
| CN | 214329280 U | 10/2021 | | |
| CN | 215053976 U | 12/2021 | | |
| DE | 20022076 U1 * | 3/2001 | ........... | E04B 1/2604 |
| DE | 202023100678 U1 * | 3/2023 | ........... | E04B 1/2604 |
| WO | WO-2018138455 A1 * | 8/2018 | ............. | E04B 1/486 |

* cited by examiner

| Design service life | Adjustment coefficient | |
|---|---|---|
| | Strength design value | Elastic modulus |
| 5 years | 1.10 | 1.10 |
| 25 years | 1.05 | 1.05 |
| 50 years | 1.00 | 1.00 |
| 100 years or more | 0.90 | 0.90 |

FIG. 8

| Serial number | Adjustment coefficient | Condition | Value |
|---|---|---|---|
| 1 | Moisture content adjustment coefficient $C_m$ | When the moisture content of wood members in use is greater than 15% | 0.8 |
| | | When the moisture content of wood members in use is less than 15% | 1.0 |
| 2 | Temperature adjustment coefficient $C_t$ | Long-term high temperature environment for production, the surface temperature of wood reaches 40°C-50°C | 0.8 |
| | | Other temperature environments | 1.0 |

FIG. 9

| $A_s/A_m$ | $A_s$ (mm²) | Quantity of fasteners in each row ||||||||||| 
|---|---|---|---|---|---|---|---|---|---|---|---|---|
| | | 2 | 3 | 4 | 5 | 6 | 7 | 8 | 9 | 10 | 11 | 12 |
| 0.5 | 3225 | 0.98 | 0.92 | 0.84 | 0.75 | 0.68 | 0.61 | 0.55 | 0.50 | 0.45 | 0.41 | 0.38 |
| | 7740 | 0.99 | 0.96 | 0.92 | 0.87 | 0.81 | 0.76 | 0.70 | 0.65 | 0.61 | 0.47 | 0.53 |
| | 12900 | 0.99 | 0.98 | 0.95 | 0.91 | 0.87 | 0.83 | 0.78 | 0.71 | 0.70 | 0.66 | 0.62 |
| | 18060 | 1.00 | 0.98 | 0.96 | 0.93 | 0.90 | 0.87 | 0.83 | 0.79 | 0.76 | 0.72 | 0.69 |
| | 25800 | 1.00 | 0.99 | 0.97 | 0.95 | 0.93 | 0.90 | 0.87 | 0.84 | 0.81 | 0.78 | 0.75 |
| | 41280 | 1.00 | 0.99 | 0.98 | 0.97 | 0.95 | 0.93 | 0.91 | 0.89 | 0.87 | 0.84 | 0.82 |
| 1 | 3225 | 1.00 | 0.97 | 0.91 | 0.85 | 0.78 | 0.71 | 0.64 | 0.59 | 0.54 | 0.49 | 0.45 |
| | 7740 | 1.00 | 0.99 | 0.96 | 0.93 | 0.88 | 0.84 | 0.79 | 0.74 | 0.70 | 0.65 | 0.61 |
| | 12900 | 1.00 | 0.99 | 0.98 | 0.95 | 0.92 | 0.89 | 0.86 | 0.82 | 0.78 | 0.75 | 0.71 |
| | 18060 | 1.00 | 0.99 | 0.98 | 0.97 | 0.94 | 0.92 | 0.89 | 0.86 | 0.83 | 0.80 | 0.77 |
| | 25800 | 1.00 | 1.00 | 0.99 | 0.98 | 0.96 | 0.94 | 0.92 | 0.90 | 0.87 | 0.85 | 0.82 |
| | 41280 | 1.00 | 1.00 | 0.99 | 0.98 | 0.97 | 0.96 | 0.95 | 0.93 | 0.91 | 0.90 | 0.88 |

Note: When the ratio $A_s/A_m$ of the gross sectional area of the side member to the gross sectional area of the main member is greater than 1.0, the $A_s/A_m$ and $A_m$ values should be used for the look-up table.

FIG. 10

| Type of connectors | Partial coefficient for resistance of each yield mode ||||
|---|---|---|---|---|
| | $\gamma_I$ | $\gamma_{II}$ | $\gamma_{III}$ | $\gamma_{IV}$ |
| Bolts, pins or hexagon head wood screws | 4.38 | 3.63 | 2.22 | 1.88 |
| Round nails | 3.42 | 2.83 | 2.22 | 1.88 |

FIG. 11

RECONSOLIDATED BAMBOO BEAM-COLUMN JOINT CONNECTED BY SUBASSEMBLY AND DESIGN METHOD

CROSS REFERENCE TO THE RELATED APPLICATIONS

This application is the continuation application of International Application No. PCT/CN2023/094664, filed on May 17, 2023, which is based upon and claims priority to Chinese Patent Application No. 202211530547.3, filed on Dec. 1, 2022, the entire contents of which are incorporated herein by reference.

TECHNICAL FIELD

The present invention relates to the field of structural engineering, in particular to a reconsolidated bamboo beam-column joint connected by a subassembly and a design method.

BACKGROUND

Connection of structural members is the key to construction, and reconsolidated bamboo structures are generally connected by steel members. Due to the high tensile strength and low shear strength of bamboo, how to exert the excellent tensile performance of reconsolidated bamboo and avoid the large shear force on the reconsolidated bamboo in joint design has become important in the design of steel-bamboo composite joints. Compared with the conventional connection methods of bamboo structures, steel-reconsolidated bamboo composite joints can better meet the requirements for complex mechanical properties of joints in modern bamboo structures. At present, common forms of steel-reconsolidated bamboo joints include complete bolt connection, mortise-tenon and bolt mixed connection, bolt welding combined connection, etc. Among them, the mortise-tenon and bolt mixed connection that draws inspiration from mortise and tenon connection in ancient wooden structures can jointly utilize the advantages of mortise and tenon connection and bolt connection, so as to provide new ideas for the design of modern bamboo structure joints and steel-reconsolidated bamboo composite structure joints under complex working conditions.

At present, patent CN215053976U discloses a cross-shaped mortise and tenon joint. The joint combines a conventional simple mortise and tenon joint with a modern bolt joint, which is beneficial to improving the bearing capacity and overall stiffness of a joint. The joint is simple in structure and convenient in construction, and can be produced in a factory in a standardized way and prefabricated and installed on site. However, its limitation lies in low utilization rate of steel, and bolt connections in the joint are implemented through L-shaped plates, resulting in low load-bearing capacity and insufficient utilization of the mechanical properties of steel. Patent CN214329280U discloses a rigid bending-resistant glued wood joint reinforced with long screw, which adopts the reinforcement concept of embedded steel plate and combines with structures such as stiffened thick angle steel, self-tapping screws, long screws, and fixed end plates, so that the joint has excellent load-bearing capacity and can cope with relatively complex stress modes. However, the joint has a limitation that it does not draw on the mortise and tenon connection used in wooden structures since ancient times. Therefore, the seismic performance of the join is not outstanding under seismic action Patent CN212358606U discloses the assembled bamboo-wood beam and column and its connector, as well as a bamboo-wood structural joint. The connection structure can greatly improve the stability, rapidity and accuracy of connection between a main body and a crossbeam. However, the structure of the joint is relatively complex and uses more bolts. Although position limitation can be well implemented in the assembly process, the overall steel consumption is relatively high, the advantages of conventional connections of bamboo and wood are not considered, and the mechanical properties of bamboo and wood are not fully utilized in the joint design. In addition, patent CN209989958U discloses a wooden pin half tenon joint reinforced with self-tapping screws. On the basis of a half tenon joint, self-tapping screws are used to reinforce local compression performance of wood perpendicular to the grain direction, and pre-drilled holes are set in the half tenon portion for inserting wooden pins to prevent tenon pulling damage, ensuring that the joint has sufficient initial stiffness, bending bearing capacity and deformation capacity, prevent tenon fracture and transverse splitting damage of wood, and improve the mechanical properties of the joint. However, its limitation lies in the use of all self-tapping screws to reinforce the tenon and beam and column members, which does not significantly improve the bearing capacity of the joint compared with embedded steel plates and the like. Moreover, inserting wooden pins for limiting and anti-pulling may lead to brittle failure modes where the wooden pins are sheared off.

Therefore, it is an urgent issue for those skilled in the art to provide a reconsolidated bamboo beam-column joint that combines a half tenon joint in conventional mortise and tenon connection with a modern bolt joint, fully utilizes the excellent seismic resistance of the half tenon joint, significantly improves its anti-pulling resistance, and effectively enhances the load-bearing capacity and seismic resistance of the joint.

SUMMARY

The objective of the present invention is to provide a reconsolidated bamboo beam-column joint connected by a subassembly and a design method. The bearing capacity of the joint is effectively improved through an H-shaped section formed by vertical steel plates and rectangular shear steel plates. A half tenon is provided with an elliptical bolt hole in a penetrating manner and connected to a reconsolidated bamboo column by a bolt, and the half tenon is rotatable along a center of the elliptical bolt hole and movable along a long axis of the elliptical bolt hole, so that the energy is dissipated through friction between the half tenon and the reconsolidated bamboo mortise, excellent energy consumption ability of the half tenon structure is fully exerted, and the anti-pulling resistance of the tenon is significantly improved. This joint is connected by bolts, and by effectively designing the shear bearing capacity of the joint, the stress state of the reconsolidated bamboo beam-column joint is clarified and the design process is simplified.

The present invention is implemented through the following technical solution:

A reconsolidated bamboo beam-column joint connected by a subassembly includes:
  a reconsolidated bamboo column;
  a reconsolidated bamboo beam;
  embedded steel plates, the embedded steel plates including vertical steel plates and rectangular shear steel plates, where left and right ends of the vertical steel plates are embedded in mortises of the reconsolidated bamboo column and the reconsolidated bamboo beam respectively, and the rectangular shear steel plates are welded to upper and lower ends of the vertical steel plates to form an H-shaped section;

a half tenon, where the half tenon includes tenon steel plates and a rotating portion, the tenon steel plates are welded to left sides of the vertical steel plates, the rotating portion is an elliptical bolt hole penetrating the half tenon, the half tenon is connected to the reconsolidated bamboo column by a bolt passing through the elliptical bolt hole, and the half tenon is rotatable along a center of the elliptical bolt hole and movable along a long axis of the elliptical bolt hole; and reconsolidated bamboo boards arranged on two sides of the half tenon.

Further, a plurality of tenon steel plates are arranged and welded equidistantly to upper left parts of the vertical steel plates, the reconsolidated bamboo boards are inserted between the tenon steel plates and extend towards the reconsolidated bamboo beam along an axis of the reconsolidated bamboo beam, and the reconsolidated bamboo boards and the tenon steel plates form the panels. Due to the presence of the steel plates, the overall stiffness of the tenon and the joint is improved, so that the tenon is less prone to fracture damage.

Further, the long side direction of the reconsolidated bamboo boards is parallel to grain direction of the bamboo, and the reconsolidated bamboo boards are directly attached to the tenon steel plates and the vertical steel plates. Since the reconsolidated bamboo boards are directly attached to the steel plates without any adhesive force, during the process of misalignment of the half tenon, the friction between the reconsolidated bamboo boards and the steel plates will further consume energy and improve the seismic performance of the joint.

Further, the upper surface of the rectangular shear steel plate located at the upper end of the vertical steel plates and the lower surface of the rectangular shear steel plate located at the lower end of the vertical steel plates are flush with upper and lower surfaces of the reconsolidated bamboo beam, and front and rear ends of the rectangular shear steel plates are aligned with edges of the reconsolidated bamboo boards, thereby reducing damage to the appearance of the reconsolidated bamboo beam and facilitating control and assembly accuracy inspection.

Further, self-tapping screws are arranged on two sides of the mortise of the reconsolidated bamboo column in the direction perpendicular to grain, and the self-tapping screws penetrate a side wall of the reconsolidated bamboo column to prevent local collapse of upper and lower sides of the reconsolidated bamboo beam-column joint due to the excessive rigidity at the half tenon embedded in the steel plates Further, the end where the mortise of the reconsolidated bamboo beam is located is embedded in the mortise of the reconsolidated bamboo column to avoid the weld seams between the steel plates at the half tenon and the vertical steel plates being in a suspended state.

Further, the rotating portion is arranged at the center of the half tenon, a plurality of bolt holes are evenly distributed in portions, located in the reconsolidated bamboo beam, of the embedded steel plates, and the center of the elliptical bolt hole is horizontally aligned with the center of the bolt hole close to the elliptical bolt hole, whereby a certain degree of horizontal movement is allowed between the mortise and the tenon, the energy will be dissipated through friction between the reconsolidated bamboo half tenon and the mortise, thus improving the seismic performance of the joint.

Further, a short axis of the elliptical bolt hole is as long as a diameter of the bolt hole and perpendicular to the axis of the reconsolidated bamboo beam, and a long axis of the elliptical bolt hole has a length of 3-4 times the diameter of the bolt hole, which further improves the seismic performance of the joint.

Further, on the basis of the above technical solution, the joint is connected through shear bolts, including a shear bolt arranged at the center of the half tenon to protect the normal function of the tenon under complex stress conditions, and a bolt group including a plurality of shear bolts arranged on the reconsolidated bamboo beam to ensure the overall shear bearing capacity of the joint; and the shear bearing capacity design of the shear bolts is performed through the following steps:

(1) verifying the shear bearing capacity of the shear bolt at the center of the half tenon;

(2) verifying the safety of the bolt bearing maximum force when the bolt group including a plurality of shear bolts on the reconsolidated bamboo beam is subjected to both torque and shear force; and (3) verifying the pressure-bearing capacity between the shear bolts and the reconsolidated bamboo beam and the reconsolidated bamboo boards.

Further, a verification formula for step (1) is:

$$N_v^b = n_v \frac{\pi d^2}{4} f_v^b, N_c^b = d \sum t f_c^b, N_{min}^b = min\{N_v^b, N_c^b\}$$

where $n_v$—number of shear surfaces (pieces);
d—diameter of a bolt bar (mm);
$\Sigma t$—smaller total thickness of compression members in the same force direction (mm);
$f_v^b$, $f_c^b$—design values of shear strength and compressive strength of the bolt (N/mm²);
$N_{min}^b$—design value of the bearing capacity of a single ordinary shear bolt (N);
a determination formula for step (2) is:

$$N_1 = \sqrt{N_{1x}^T{}^2 + (N_{1y}^T + N_{1y}^F)^2} = \sqrt{\left(\frac{Ty_1}{\sum(x_i^2 + y_i^2)}\right)^2 + \left(\frac{Tx_1}{\sum(x_i^2 + y_i^2)} + \frac{F}{n}\right)^2} \leq N_{min}^b$$

$$N_{1x}^T = \frac{Ty_1}{\sum(x_i^2 + y_i^2)}, N_{1y}^T = \frac{Tx_1}{\sum(x_i^2 + y_i^2)}$$

$$N_{1y}^F = \frac{F}{n}$$

where $N_1$—bearing capacity of the bolt group under the torque-shear composite effect (N);
$N_{1x}^T$—horizontal shear force borne by corner bolt 1 under the torque effect (N);
$N_{1y}^T$—vertical shear force borne by corner bolt 1 under the torque effect (N);
$N_{1y}^F$—vertical shear force borne by corner bolt 1 under the shear effect (N);
T—torque borne by the bolt group (N·mm);
F—shear force borne by the bolt group (N);
$y_i$—distance between the bolt i and the horizontal mandrel of bolt group (mm);

$x_i$—distance between the bolt i and the vertical mandrel of bolt group (mm).

A determination formula for step (3) is:

$$Z_d = C_m C_n C_t k_g Z$$

$$Z = k_{min} t_s d f_{es}$$

$$k_{min} = \min[k_I, k_{II}, k_{III}, k_{IV}]$$

$$k_I = \frac{R_e \cdot R_1}{\gamma_I}$$

$$k_{II} = \frac{k_{sII}}{\gamma_{II}}$$

$$k_{sII} = \frac{\sqrt{R_e + 2R_e^2(1 + R_t + R_t^2) + R_t^2 R_e^3} - R_e(1 + R_t)}{1 + R_e}$$

$$k_{III} = \frac{k_{sIII}}{\gamma_{III}}$$

When the yield mode of single shear connection is $III_m$:

$$k_{sIII} = \frac{R_t R_e}{1 + 2R_e}\left[\sqrt{2(1 + R_e) + \frac{1.647(1 + 2R_e)k_{ep}f_{yk}d^2}{3R_e R_t^2 f_{es} t_s^2}} - 1\right]$$

When the yield mode is $III_s$:

$$k_{sIII} = \frac{R_e}{2 + R_e}\left[\sqrt{\frac{2(1 + R_e)}{R_e} + \frac{1.647(1 + 2R_e)k_{ep}f_{yk}d^2}{3R_e f_{es} t_s^2}} - 1\right]$$

$$k_{IV} = \frac{k_{sIV}}{\gamma_{IV}}$$

$$k_{sIV} = \frac{d}{t_s}\sqrt{\frac{1.647 R_e k_{ep} f_{yk}}{3(1 + R_e) f_{es}}}$$

where $Z_d$—design value of pressure-bearing capacity of a single shear surface (N);
$C_m$—moisture content adjustment coefficient;
$C_n$—design service life adjustment coefficient;
$C_t$—temperature adjustment coefficient;
$k_g$—group bolt combination coefficient;
Z—design reference value of bearing capacity (N);
$k_{min}$—minimum effective length coefficient of pressure-bearing capacity of a pin groove of a thinner member during single shear connection or an edge member during double shear connection;
$t_s$—thickness of the thinner member of the edge member (mm);
d—diameter of the bolt (mm);
$f_{es}$—standard value of bearing strength of the pin groove of the member (N/mm$^2$);
$k_I, k_{II}, k_{III}, k_{IV}$—effective length coefficients of pressure-bearing capacity of the pin groove in yield modes I, II, III, and IV;
$R_e, R_t$—$f_{em}/f_{es}$ and $t_m/t_s$, $R_e \cdot R_t \leq 1.0$ for single shear connection; $R_e \cdot R_t \leq 2.0$ for double shear connection, the effective coefficient $k_I$ of pressure-bearing capacity of the pin groove is calculated by $$k_I = \frac{R_e \cdot R_t}{2\gamma_I};$$

$t_m$—thickness of a thicker member or a middle member (mm);
$f_{em}$—standard value of bearing strength of a pin groove of the thicker member of the middle member (N/mm$^2$);
$\gamma_I, \gamma_{II}, \gamma_{III}, \gamma_{IV}$—partial coefficients for resistance of yield modes I, II, III, and IV;
$f_{yk}$—standard value of yield strength value for pin type fasteners (N/mm$^2$);
$k_{ep}$—elastoplastic strengthening coefficient.

From the foregoing technical solution, it can be seen that compared with the prior art, the present invention discloses a reconsolidated bamboo beam-column joint connected by a subassembly and a design method, where rectangular shear steel plates and vertical steel plates in embedded steel plates form an H-shaped section, and left and right ends of the vertical steel plates are embedded in mortises of the reconsolidated bamboo column and the reconsolidated bamboo beam respectively, thereby effectively improving bearing capacity and assembly accuracy of the joint. A half tenon is provided with an elliptical bolt hole in a penetrating manner and connected to the reconsolidated bamboo column by a bolt, and the half tenon is rotatable along a center of the elliptical bolt hole and movable along a long axis of the elliptical bolt hole, so that the energy is dissipated through friction between the reconsolidated bamboo half tenon and mortises, the excellent energy consumption ability of the half tenon structure is fully exerted, and the tenon anti-pulling resistance is significantly improved. The reconsolidated bamboo boards cover the two sides of the half tenon and tenon steel plates, and extend towards the reconsolidated bamboo beam along an axis of the reconsolidated bamboo beam, and the reconsolidated bamboo boards and the tenon steel plates jointly form panels. Due to the presence of the steel plates, the overall stiffness of the tenon and the joint is improved, so that the tenon is less prone to fracture damage. Meanwhile, the joint connected by bolts is high in assembly rate and convenient and fast to assemble By effectively designing the shear bearing capacity of bolts, the stress state of the reconsolidated bamboo beam-column joint is clarified, and the design process is simplified.

BRIEF DESCRIPTION OF THE DRAWINGS

In order to illustrate the technical solutions in the exemplary embodiments of the present invention more clearly, accompanying drawings required to use in the embodiments will be simply introduced below. It should be understood that the following drawings show only some embodiments of the present invention and should not be regarded as limiting the scope, and other relevant drawings may be obtained based on these drawings by those of ordinary skill in the art without any creative efforts. In the figures.

REFERENCE NUMERALS AND CORRESPONDING COMPONENT NAMES IN THE DRAWINGS

1—reconsolidated bamboo column; 2—reconsolidated bamboo beam; 3—reconsolidated bamboo board; 4—tenon steel plate; 5—half tenon; 6—embedded steel plate; 7—rectangular shear steel plate; 8—vertical steel plate; 9—shear bolt; 10—elliptical bolt hole; 11—self-tapping screw.

DETAILED DESCRIPTION OF THE EMBODIMENTS

In order to make the objectives, technical solutions, and advantages of the present invention clearer, the present invention will be further described in detail below with reference to embodiments and the accompanying drawings. The schematic implementations of the present invention and explanations thereof are only used for explaining the present invention and are not intended to limit the present invention.

Embodiment 1

This embodiment of the present invention discloses a reconsolidated bamboo beam-column joint connected by a subassembly. Rectangular shear steel plates 7 and vertical steel plates 8 in embedded steel plates 6 form an H-shaped section, and left and right ends of the vertical steel plates 8 are embedded in mortises of a reconsolidated bamboo column 1 and a reconsolidated bamboo beam 2 respectively, thereby effectively improving the bearing capacity and the assembly accuracy of the joint. In addition, a half tenon 5 is provided with a rotating portion, the rotating portion is an elliptical bolt hole 10 penetrating the half tenon 5, the half tenon 5 is connected to the reconsolidated bamboo column 1 by a shear bolt 9 passing through the elliptical bolt hole 10, and the half tenon 5 is rotatable along a center of the elliptical bolt hole 10 and movable along a long axis of the elliptical bolt hole 10, whereby the energy is dissipated through friction between the half tenon S and the mortise of the reconsolidated bamboo column 1, the excellent energy consumption ability of the half tenon structure is fully exerted, and the anti-pulling resistance of the tenon is significantly improved.

With reference to FIGS. 1-7, the reconsolidated bamboo beam-column joint specifically includes: a reconsolidated bamboo column 1, a reconsolidated bamboo beam 2, embedded steel plates 6, and a half tenon 5. The embedded steel plates 6 include vertical steel plates 8 and rectangular shear steel plates 7, left and right ends of the vertical steel plates 8 are embedded in mortises of the reconsolidated bamboo column 1 and the reconsolidated bamboo beam 2 respectively, and the rectangular shear steel plates 7 are welded to upper and lower ends of the vertical steel plates 8 to form an H-shaped section for resisting shear force. The half tenon 5 includes tenon steel plates 4 and a rotating portion, and the tenon steel plates 4 are welded to an upper left end of the vertical steel plate 8. In this embodiment, spot welding is used between the rectangular steel plates 7 and the vertical steel plates 8, and between the vertical steel plates 8 and the tenon steel plates 4. The steel plates are made of Q355 steel and may have a thickness of 10 mm. The rotating portion connects the half tenon 5 to the reconsolidated bamboo column 1 through shear bolts 9, so that the half tenon 5 rotates along a center of the rotating portion and moves horizontally to improve the overall seismic resistance of the joint. Specifically, the rotating portion is an elliptical bolt hole 10 penetrating the half tenon 5, or a rectangular hole without restriction. The elliptical bolt hole 10 is located at the center of the half tenon 5, and a plurality of bolt through holes are evenly distributed in portions, located in the reconsolidated bamboo beam 2, of the embedded steel plates 6. The embedded steel plates 6 are connected to the reconsolidated bamboo beam 2 through shear bolts 9, so that the shear bolts 9 and the embedded steel plates 6 jointly bear shear force and bending moment. The center of the elliptical bolt hole 10 is horizontally aligned with the center of the bolt hole close to the elliptical bolt hole 10, where a short axis of the elliptical bolt hole 10 is as long as a diameter of the bolt hole and perpendicular to an axis of the reconsolidated bamboo beam 2, and a long axis of the elliptical bolt hole 10 has a length of 3-4 times the diameter of the bolt hole, whereby a certain degree of horizontal movement is allowed between the mortise and the tenon. The shear bolt 9 connects and fixes the half tenon 5 and the reconsolidated bamboo column 1 through the elliptical bolt hole 10, which can also achieve a good limiting effect on the half tenon 5 and avoid the occurrence of tenon pulling damage in the connection structure, thereby ensuring the normal function of the half tenon 5 under complex stress conditions.

In this embodiment, a plurality of tenon steel plates 4 are arranged and welded equidistantly to upper left ends of the vertical steel plates 8, reconsolidated bamboo boards 3 are arranged on two sides of the half tenon 5 and inserted between the tenon steel plates 4, the reconsolidated bamboo boards 3 extend towards the reconsolidated bamboo beam 2 along the axis of the reconsolidated bamboo beam 2, and the reconsolidated bamboo boards 3 and the tenon steel plates 4 form panels. Due to the presence of the steel plates, the overall stiffness of the tenon and the joint is improved, so that the tenon is less prone to fracture damage.

Figure 3:
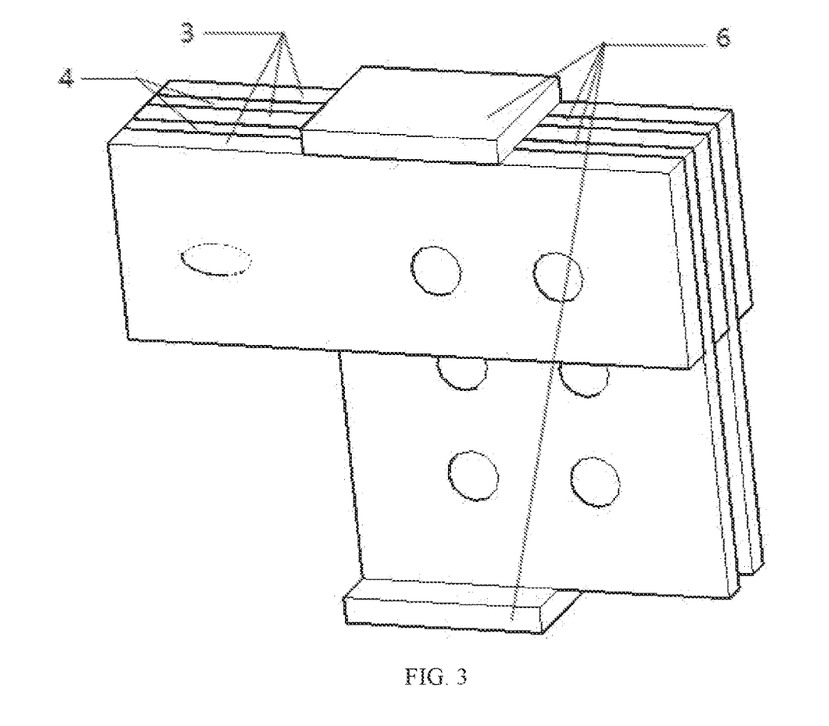
FIG. 3 is a schematic diagram of a steel-reconsolidated bamboo composite panel and tenon structure provided by the present invention.

In this embodiment, the long side direction of the reconsolidated bamboo boards 3 is parallel to grain direction, and the reconsolidated bamboo boards 3 are directly attached to the tenon steel plates 4 and the vertical steel plates 8 without any adhesive force, so that the friction between the reconsolidated bamboo boards 3 and the steel plates will further consume energy during the horizontal movement of the half tenon 5, so as to improve the seismic performance of the joint, reduce the damage to the appearance of the reconsolidated bamboo beam 2, and facilitate control and assembly accuracy inspection. The upper surface of the rectangular shear steel plate 7 located at the upper end of the vertical steel plates 8 and the lower surface of the rectangular shear steel plate 7 located at the lower end of the vertical steel plates 8 are flush with upper and lower surfaces of the reconsolidated bamboo beam 2, two ends of the rectangular shear steel plates 7 and the reconsolidated bamboo boards 3 in the same direction are aligned, and seams on the edge of the rectangular shear steel plates 7 in contact with the reconsolidated bamboo beam 2 are bonded with a structural adhesive, as shown in FIG. 3. Seams on contact surfaces between the whole formed by embedded steel plates 6 with reconsolidated bamboo boards 3 and the reconsolidated bamboo beam 2 are also bonded with the structural adhesive, making the appearance of the reconsolidated bamboo beam 2 more attractive.

In this embodiment, self-tapping screws 11 are arranged on two sides of the mortise of the reconsolidated bamboo column 1 in the direction perpendicular to grain. The self-tapping screws 11 penetrate the reconsolidated bamboo column 1 to reinforce the local compression region and prevent the local collapse of upper and lower sides of the reconsolidated bamboo beam-column joint due to the excessive rigidity at the half tenon 5 embedded in the steel plates. In addition, the layout of the self-tapping screws 11, such as the number of the horizontal and vertical rows for reinforcement or no reinforcement, may be selected according to the actual stress state, the number of structural layers, the span of the structure, and the like.

In this embodiment, the end where the mortise of the reconsolidated bamboo beam 2 is located is embedded in the mortise of the reconsolidated bamboo column 1 to avoid the weld seams between the steel plates at the half tenon 5 and the vertical steel plates 8 being in a suspended state. In the foregoing implementation process, the steel plates in the joint are connected by welding, but all the weld seams are not at the positions of $M_{max}$ and $V_{max}$ (namely, positions of maximum bending moment and maximum shear force), which can effectively avoid brittle failure caused by weld seam fracture.

Figure 1:
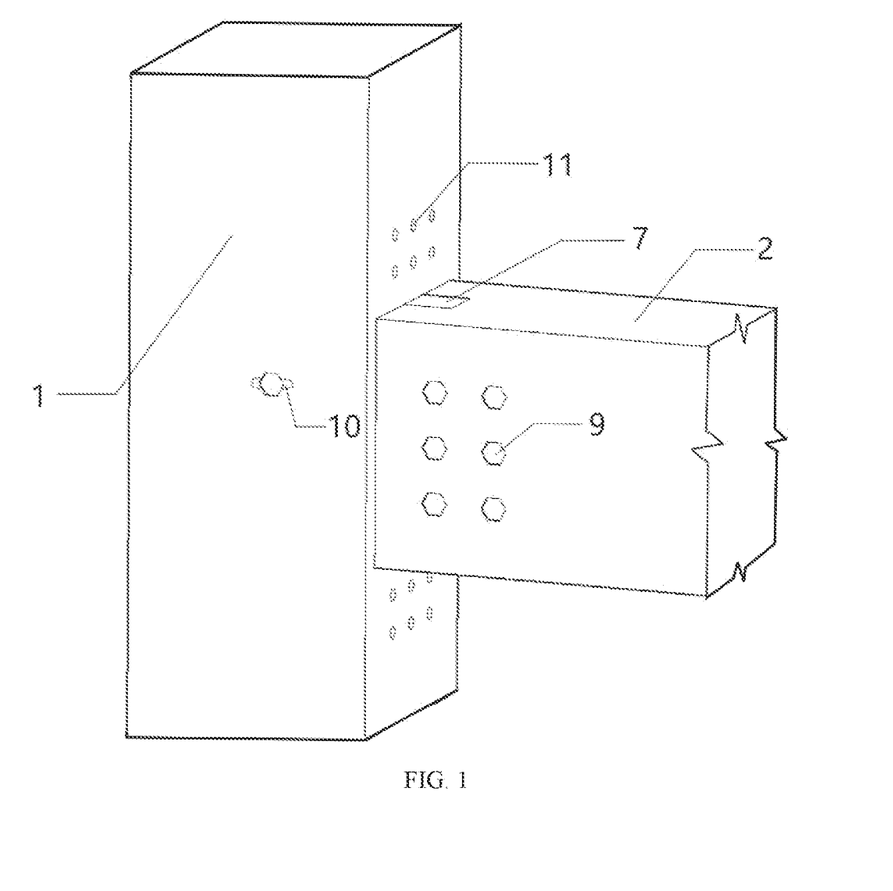
FIG. 1 is a schematic diagram of a beam-column joint provided by the present invention.
Figure 2:
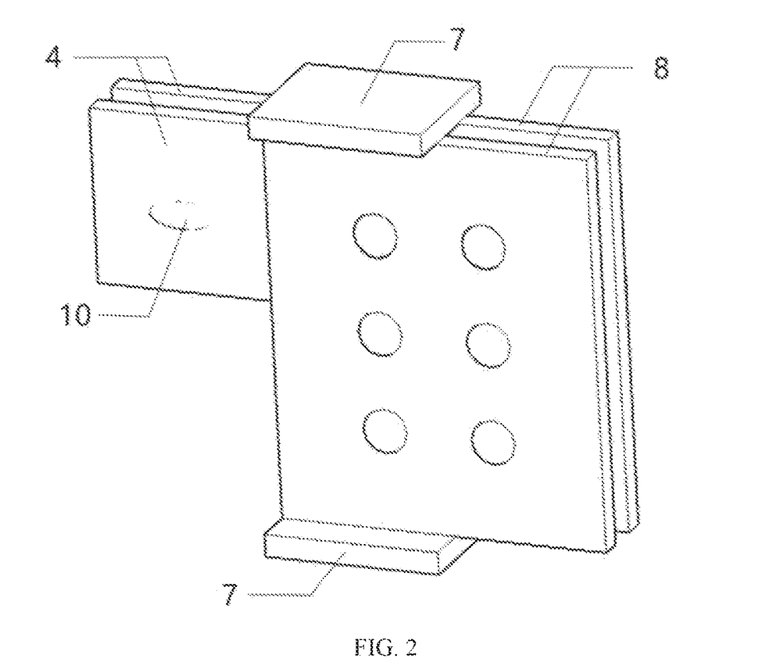
FIG. 2 is a schematic diagram of an embedded steel plate and tenon structure provided by the present invention.
Figure 4:
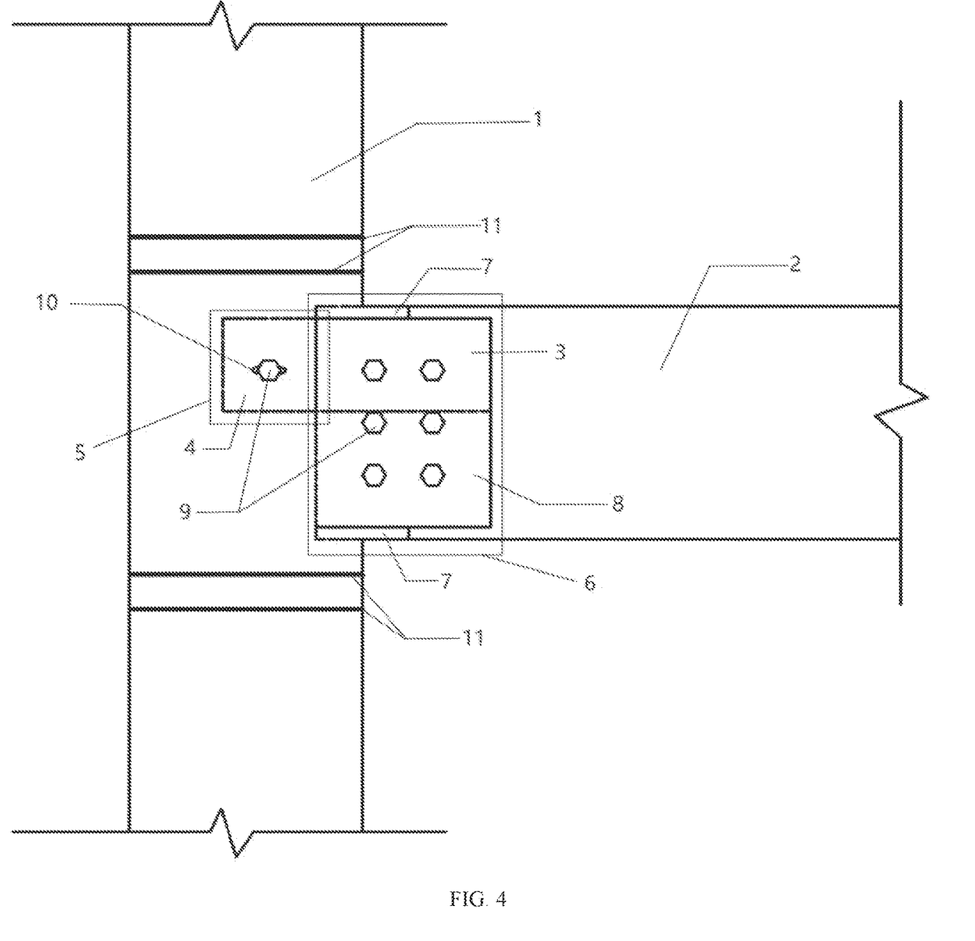
FIG. 4 is a side schematic diagram of the beam-column joint provided by the present invention.
Figure 5:
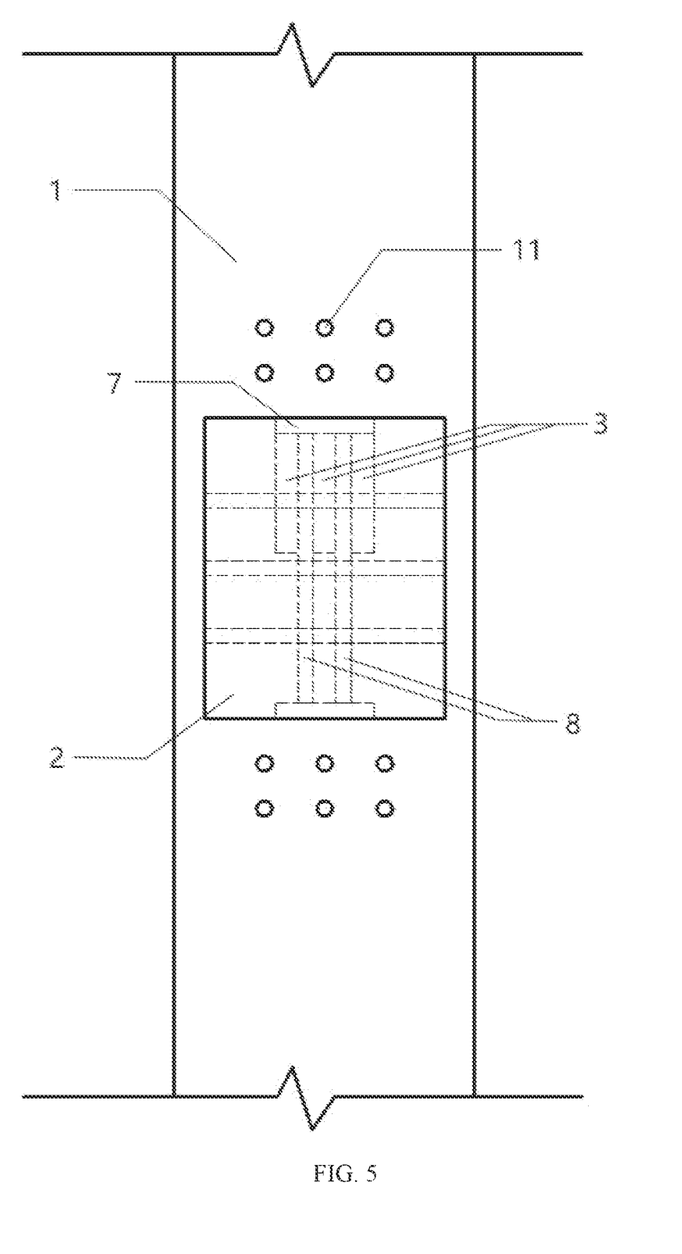
FIG. 5 is a front schematic diagram of the beam-column joint provided by the present invention.
Figure 6:
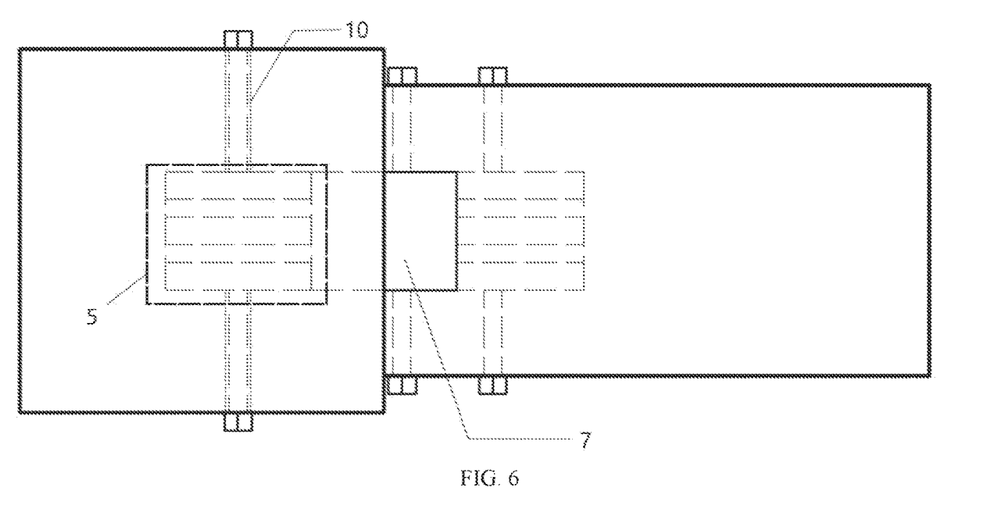
FIG. 6 is a top view of the beam-column joint provided by the present invention.
Figure 7:
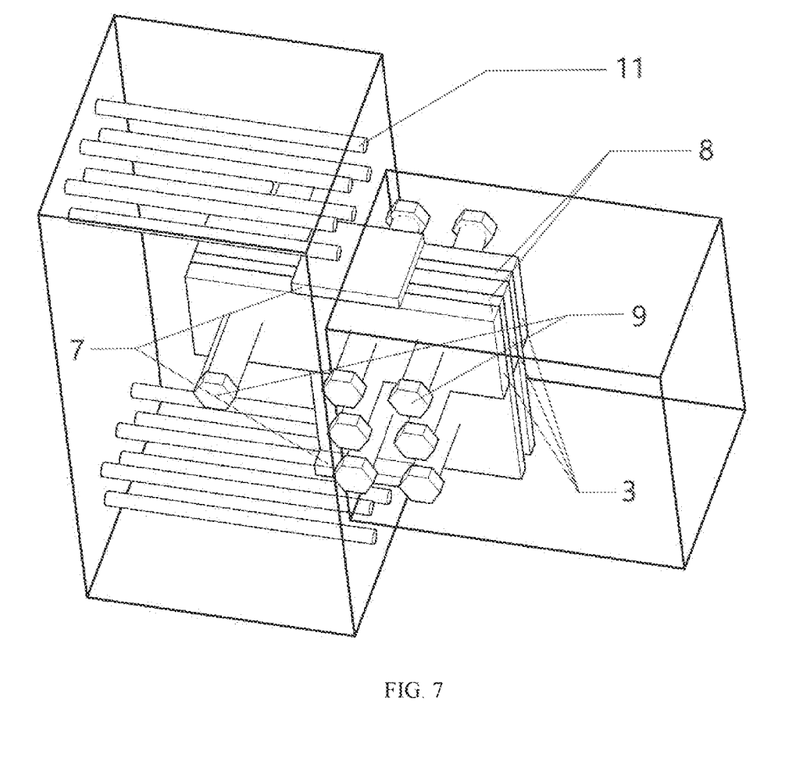
FIG. 7 is a perspective view of a beam-column joint steel plate subassembly and self-tapping screws provided by the present invention.

In addition, the nut of the shear bolt 9 is embedded in the reconsolidated bamboo beam 2 or the reconsolidated bamboo column 1, and the outermost end of the nut does not exceed the surface of the reconsolidated bamboo beam 2 or the reconsolidated bamboo column 1, whereby assembly is facilitated. Moreover, the joint is connected through the shear bolts 9, so that all components can be prefabricated in the factory and assembled on site, with a high degree of industrialization and convenient construction. Specifically, the reconsolidated bamboo beam 2 and the reconsolidated bamboo column 1 are first processed in the factory according to specified dimensions, and the mortises for installing the embedded steel plates 6 and the half tenon 5 are reserved on the reconsolidated bamboo beam 2 and the reconsolidated bamboo column 1 as shown in FIG. 4. At the same time, the steel-reconsolidated bamboo composite panels and the mortises are manufactured as shown in FIG. 2 and FIG. 3. The bolt holes and the elliptical bolt hole 10 are also reserved at the bolt connection positions, and the shear bolt 9 will be used for auxiliary fixation.

The present invention discloses a design method for a reconsolidated bamboo beam-column joint connected by a subassembly. The joint is connected by shear bolts 9, including a shear bolt 9 arranged at the center of the half tenon 5 to protect the normal function of the tenon under complex stress conditions, and a bolt group including a plurality of shear bolts 9 arranged on the reconsolidated bamboo beam 2 to ensure the overall shear bearing capacity of the joint. This joint uses ordinary bolts, and the design mainly focuses on the shear bolts 9 at the end of the reconsolidated bamboo beam 2, where the stress mode of the shear bolts 9 is mainly the torque-shear composite effect. Because the shear bolt 9 at the reconsolidated bamboo column 1 mainly achieves the effects of limiting, tenon anti-pulling, and friction energy consumption, this bolt is designed in the same model as the bolts at the end of the reconsolidated bamboo beam 2 in order to simplify the joint design process. Therefore, the shear bearing capacity design of the bolt group including a plurality of shear bolts 9 is performed through the following steps:

(1) First, the shear bearing capacity of the shear bolt 9 at the center of the half tenon S is verified. A verification formula is as follows:

$$N_v^b = n_v \frac{\pi d^2}{4} f_v^b, \quad N_c^b = d \sum t f_c^b, \quad N_{min}^b = \min\{N_v^b, N_c^b\}$$

where $n_v$—number of shear surfaces (pieces);
d—diameter of a bolt bar (mm);
$\Sigma t$—smaller total thickness of compression members in the same force direction (mm);
$f_v^b, f_c^b$—design values of shear strength and compressive strength of the bolt (N/mm²);
$N_{min}^b$—design value of the bearing capacity of a single ordinary shear bolt (N).

(2) When the bolt group on the reconsolidated bamboo beam 2 is subjected to both torque and shear force, the safety of the bolt bearing maximum force needs to be verified. A determination formula is as follows:

$$N_1 = \sqrt{N_{1x}^{T^2} + (N_{1y}^T + N_{1y}^F)^2} = \sqrt{\left(\frac{Ty_1}{\sum(x_i^2 + y_i^2)}\right)^2 + \left(\frac{Tx_1}{\sum(x_i^2 + y_i^2)} + \frac{F}{n}\right)^2} \le N_{min}^b$$

$$N_{1x}^T = \frac{Ty_1}{\sum(x_i^2 + y_i^2)}, \quad N_{1y}^T = \frac{Tx_1}{\sum(x_i^2 + y_i^2)}$$

$$N_{1y}^F = \frac{F}{n}$$

where $N_1$—bearing capacity of the bolt group under the torque-shear composite effect (N);
$N_{1x}^T$—horizontal shear force borne by corner bolt 1 under the torque effect (N);
$N_{1y}^T$—vertical shear force borne by corner bolt 1 under the torque effect (N);
$N_{1y}^F$—vertical shear force borne by corner bolt 1 under the shear effect (N);
T—torque borne by the bolt group (N·mm);
F—shear force borne by the bolt group (N);
$y_i$—distance between the bolt i and the horizontal mandrel of bolt group (mm);
$x_i$—distance between the bolt i and the vertical mandrel of bolt group (mm).

(3) Considering the compression between the bolts and the reconsolidated bamboo beam 2 after yielding of the steel plates in the actual stress process, the pressure-bearing capacity between the shear bolts 9 and the reconsolidated bamboo beam 2 and the reconsolidated bamboo boards 3 also needs to be verified. Formulas are as follows:

$$Z_d = C_m C_n C_t k_g Z$$

$$Z = k_{min} t_s d f_{es}$$

$$k_{min} = \min[k_I, k_{II}, k_{III}, k_{IV}]$$

$$k_I = \frac{R_e \cdot R_t}{\gamma_I}$$

-continued $$k_{II} = \frac{k_{sII}}{\gamma_{II}}$$

$$k_{sII} = \frac{\sqrt{R_e + 2R_e^2(1+R_t+R_t^2)+R_t^2 R_e^3} - R_e(1+R_t)}{1+R_e}$$

$$k_{III} = \frac{k_{sIII}}{\gamma_{III}}$$

When the yield mode of single shear connection is $III_m$:

$$k_{sIII} = \frac{R_t R_e}{1+2R_e}\left[\sqrt{2(1+R_e)+\frac{1.647(1+2R_e)k_{ep}f_{yk}d^2}{3R_e R_t^2 f_{es}t_s^2}} - 1\right]$$

Figure 8:
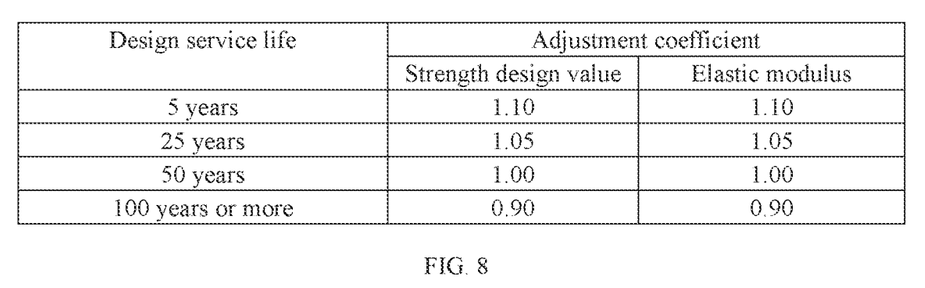
FIG. 8 shows a design service life adjustment coefficient table provided by the present invention.
Figure 9:
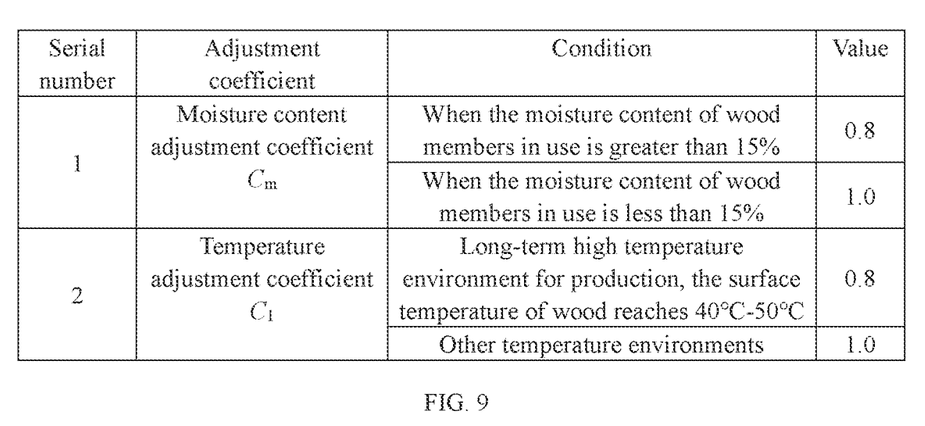
FIG. 9 shows a moisture content adjustment coefficient and temperature adjustment coefficient table provided by the present invention.
Figure 10:
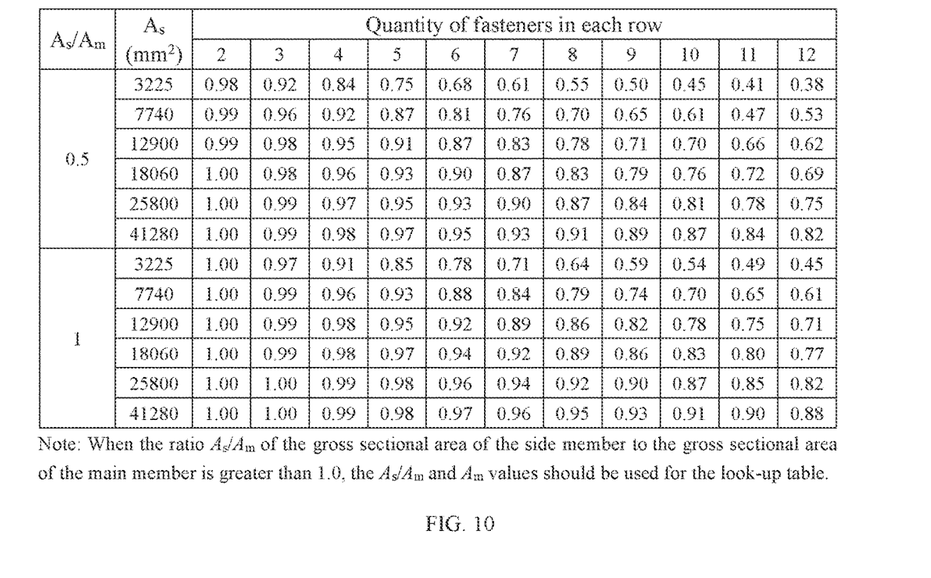
FIG. 10 shows a group bolt combination coefficient table provided by the present invention.

When the yield mode is $III_s$:

$$k_{sIII} = \frac{R_e}{2+R_e}\left[\sqrt{\frac{2(1+R_e)}{R_e}+\frac{1.647(1+2R_e)k_{ep}f_{yk}d^2}{3R_e f_{es}t_s^2}} - 1\right]$$

$$k_{IV} = \frac{k_{sIV}}{\gamma_{IV}}$$

$$k_{sIV} = \frac{d}{t_s}\sqrt{\frac{1.647 R_e k_{ep}f_{yk}}{3(1+R_e)f_{es}}}$$

where $Z_d$—design value of pressure-bearing capacity of a single shear surface (N);

$C_m$—moisture content adjustment coefficient, as shown in FIG. 9;

$C_n$—design service life adjustment coefficient, as shown in FIG. 8;

$C_t$—temperature adjustment coefficient, as shown in FIG. 9;

$k_g$—group bolt combination coefficient, as shown in FIG. 10;

Z—design reference value of bearing capacity (N);

$k_{min}$—minimum effective length coefficient of pressure-bearing capacity of a pin groove of a thinner member during single shear connection or an edge member during double shear connection;

$t_s$—thickness of the thinner member of the edge member (mm);

d—diameter of the bolt (mm);

$f_{es}$—standard value of bearing strength of the pin groove of the member (N/mm²); determined in accordance with article 6.2.8 of the Chinese Standard for Design of Timber Structures (GB 50005-2017);

$k_I, k_{II}, k_{III}, k_{IV}$—effective length coefficients of pressure-bearing capacity of the pin groove in yield modes I, II, III, and IV;

$R_e, R_t$—$f_{em}/f_{es}$ and $t_m/t_s$, $R_e \cdot R_t \le 1.0$ for single shear connection; $R_e \cdot R_t \le 2.0$ for double shear connection, the effective coefficient $k_I$ of pressure-bearing capacity of the pin groove is calculated by $$k_I = \frac{R_e \cdot R_t}{2\gamma_I};$$

Figure 11:
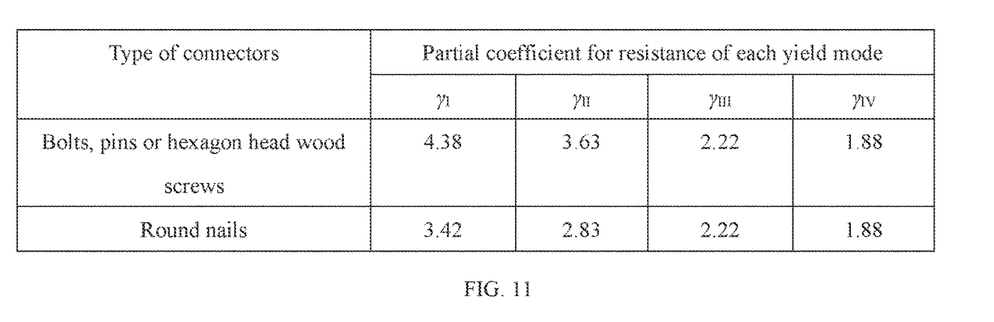
FIG. 11 shows a table of partial coefficients for resistance provided by the present invention.

$t_m$—thickness of a thicker member or a middle member (mm);

$f_{em}$—standard value of bearing strength of a pin groove of the thicker member of the middle member (N/mm²), determined in accordance with article 6.2.8 of the Chinese Standard for Design of Timber Structures (GB 50005-2017);

$\gamma_I, \gamma_{II}, \gamma_{III}, \gamma_{IV}$—partial coefficients for resistance of yield modes I, II, III, and IV, as shown in FIG. 11;

$k_{sII}, k_{mIII}, k_{sIII}, k_{sIV}$—effective pressure-bearing coefficients of the pin groove of yield modes $II_s$, $III_m$, $III_s$, and $IV_s$;

$f_{yk}$—standard value of yield strength value for pin type fasteners (N/mm²);

$k_{ep}$—elastoplastic strengthening coefficient.

Through the foregoing method, the shear bearing capacity of the shear bolt 9 at the center of the half tenon 5 is verified, then the safety of the bolt bearing maximum force is verified for the bolt group on the reconsolidated bamboo beam 2, and the pressure-bearing capacity between the shear bolts 9 and the reconsolidated bamboo beam 2 and the reconsolidated bamboo boards 3 is verified, thereby ensuring the safety of the entire reconsolidated bamboo beam-column joint, clarifying the stress state of the joint, and simplifying the design process.

In the foregoing specific implementations, the objectives, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention shall fall within the protection scope of the present invention.

What is claimed is:

1. A reconsolidated bamboo beam-column joint connected by a subassembly, comprising:
   a reconsolidated bamboo column;
   a reconsolidated bamboo beam;
   embedded steel plates, the embedded steel plates comprising vertical steel plates and rectangular shear steel plates, wherein
   left and right ends of the vertical steel plates are embedded in a mortise of the reconsolidated bamboo column and a mortise of the reconsolidated bamboo beam respectively, and the rectangular shear steel plates are welded to upper and lower ends of the vertical steel plates to form an H-shaped section;
   a half tenon, wherein the half tenon comprises tenon steel plates and a rotating portion, wherein the tenon steel plates are welded to left sides of the vertical steel plates, the rotating portion is an elliptical bolt hole penetrating the half tenon, the half tenon is connected to the reconsolidated bamboo column through the elliptical bolt hole, and the half tenon is rotatable along a center of the elliptical bolt hole and movable along a long axis of the elliptical bolt hole; and
   reconsolidated bamboo boards arranged on two sides of the half tenon.

2. The reconsolidated bamboo beam-column joint connected by the subassembly according to claim 1, wherein the tenon steel plates are arranged and welded equidistantly to upper left parts of the vertical steel plates, and the reconsolidated bamboo boards are inserted between the tenon steel plates and extend towards the reconsolidated bamboo beam along an axis of the reconsolidated bamboo beam.

3. The reconsolidated bamboo beam-column joint connected by the subassembly according to claim 2, wherein a long side direction of the reconsolidated bamboo boards is parallel to a grain direction of a bamboo, and the reconsolidated bamboo boards are directly attached to the plurality of tenon steel plates and the vertical steel plates.

4. The reconsolidated bamboo beam-column joint connected by the subassembly according to claim 3, wherein an upper surface of the rectangular shear steel plate located at upper ends of the vertical steel plates and a lower surface of the rectangular shear steel plate located at lower ends of the vertical steel plates are flush with upper and lower surfaces of the reconsolidated bamboo beam, and front and rear ends of the rectangular shear steel plates are aligned with edges of the reconsolidated bamboo boards.

5. The reconsolidated bamboo beam-column joint connected by the subassembly according to claim 1, wherein self-tapping screws are arranged on two sides of the mortise of the reconsolidated bamboo column in a direction perpendicular to grain, and the self-tapping screws penetrate a side wall of the reconsolidated bamboo column.

6. The reconsolidated bamboo beam-column joint connected by the subassembly according to claim 1, wherein an end where the mortise of the reconsolidated bamboo beam is located is embedded in the mortise of the reconsolidated bamboo column.

7. The reconsolidated bamboo beam-column joint connected by the subassembly according to claim 1, wherein the rotating portion is arranged at a center of the half tenon; a plurality of bolt holes are evenly distributed in portions, located in the reconsolidated bamboo beam, of the embedded steel plates; and the center of the elliptical bolt hole is horizontally aligned with a center of a bolt hole adjacent to the elliptical bolt hole.

8. The reconsolidated bamboo beam-column joint connected by the subassembly according to claim 7, wherein a short axis of the elliptical bolt hole is as long as a diameter of the bolt hole and perpendicular to an axis of the reconsolidated bamboo beam, and the long axis of the elliptical bolt hole has a length of 3-4 times the diameter of the bolt hole.

9. A design method for the reconsolidated bamboo beam-column joint connected by the subassembly according to claim 1, wherein the reconsolidated bamboo beam-column joint is connected through shear bolts, comprising a shear bolt arranged at a center of the half tenon to protect a normal function of a tenon under complex stress conditions, and a bolt group comprising a plurality of shear bolts arranged on the reconsolidated bamboo beam to ensure an overall shear bearing capacity of the reconsolidated bamboo beam-column joint; and a shear bearing capacity design of the shear bolts is performed through the following steps:

step (1): verifying the shear bearing capacity of the shear bolt at the center of the half tenon;

step (2): verifying a safety of a bolt bearing a maximum force when the bolt group comprising the plurality of shear bolts on the reconsolidated bamboo beam is subjected to both torque and shear force; and step (3): verifying a pressure-bearing capacity between the shear bolts and the reconsolidated bamboo beam and the reconsolidated bamboo boards.

10. The design method according to claim 9, wherein a verification formula for step (1) is:

$$N_v^b = n_v \frac{\pi d^2}{4} f_v^b, \quad N_c^b = d \sum t f_c^b, \quad N_{min}^b = \min\{N_v^b, N_c^b\},$$

wherein $n_v$—number of shear surfaces (pieces);

d—diameter of a bolt bar (mm);
Σt—smaller total thickness of compression members in a same force direction (mm);
$f_v^b$, $f_c^b$—design values of shear strength and compressive strength of the bolt (N/mm²);
$N_{min}^b$—design value of a bearing capacity of a single ordinary shear bolt (N);
a determination formula for step (2) is:

$$N_1 = \sqrt{N_{1x}^T{}^2 + (N_{1y}^T + N_{1y}^F)^2} = \sqrt{\left(\frac{Ty_1}{\sum(x_i^2 + y_i^2)}\right)^2 + \left(\frac{Tx_1}{\sum(x_i^2 + y_i^2)} + \frac{F}{n}\right)^2} \leq N_{min}^b,$$

$$N_{1x}^T = \frac{Ty_1}{\sum(x_i^2 + y_i^2)}, \quad N_{1y}^T = \frac{Tx_1}{\sum(x_i^2 + y_i^2)},$$

$$N_{1y}^F = \frac{F}{n},$$

wherein $N_1$—bearing capacity of the bolt group under a torque-shear composite effect (N);
$N_1^{xT}$—horizontal shear force borne by corner bolt 1 under a torque effect (N);
$N_{1y}^T$—vertical shear force borne by corner bolt 1 under the torque effect (N);
$N_{1y}^F$—vertical shear force borne by corner bolt 1 under a shear effect (N);
T—torque borne by the bolt group (N·mm);
F—shear force borne by the bolt group (N);
$y_i$—distance between a bolt i and a horizontal mandrel of the bolt group (mm);
$x_i$—distance between the bolt i and a vertical mandrel of the bolt group (mm);
a determination formula for step (3) is:

$$Z_d = C_m C_n C_t k_g Z,$$

$$Z = k_{min} t_s d f_{es},$$

$$k_{min} = \min[k_I, k_{II}, k_{III}, k_{IV}],$$

$$k_I = \frac{R_e \cdot R_t}{\gamma_I},$$

$$k_{II} = \frac{k_{sII}}{\gamma_{II}},$$

$$k_{sII} = \frac{\sqrt{R_e + 2R_e^2(1 + R_t + R_t^2) + R_t^2 R_e^3} - R_e(1 + R_t)}{1 + R_e},$$

$$k_{III} = \frac{k_{sIII}}{\gamma_{III}};$$

when a yield mode of single shear connection is $III_m$:

$$k_{sIII} = \frac{R_t R_e}{1 + 2R_e}\left[\sqrt{2(1 + R_e) + \frac{1.647(1 + 2R_e)k_{ep}f_{yk}d^2}{3R_e R_t^2 f_{es} t_s^2}} - 1\right],$$

when the yield mode is $III_s$:

$$k_{sIII} = \frac{R_e}{2 + R_e}\left[\sqrt{\frac{2(1 + R_e)}{R_e} + \frac{1.647(1 + 2R_e)k_{ep}f_{yk}d^2}{3R_e f_{es} t_s^2}} - 1\right],$$

$$k_{IV} = \frac{k_{sIV}}{\gamma_{IV}},$$

-continued $$k_{sIV} = \frac{d}{t_s} \sqrt{\frac{1.647 R_e k_{ep} f_{yk}}{3(1+R_e) f_{es}}},$$

wherein $Z_d$—design value of pressure-bearing capacity of a single shear surface (N);
$C_m$—moisture content adjustment coefficient;
$C_n$—design service life adjustment coefficient;
$C_t$—temperature adjustment coefficient;
$k_g$—group bolt combination coefficient;
$Z$—design reference value of bearing capacity (N);
$k_{min}$— minimum effective length coefficient of pressure-bearing capacity of a pin groove of a thinner member during single shear connection or an edge member during double shear connection;
$t_s$—thickness of the thinner member or the edge member (mm);
d—diameter of the bolt (mm);
$f_{es}$—standard value of bearing strength of the pin groove of the member (N/mm²);
$k_I$, $k_{II}$, $k_{III}$, $k_{IV}$—effective length coefficients of pressure-bearing capacity of the pin groove in yield modes I, II, III, and IV;
$R_e$, $R_t$—$f_{em}/f_{es}$ and $t_m/t_s$, $R_e \cdot R_t \leq 1.0$ for the single shear connection; $R_e \cdot R_t \leq 2.0$ for the double shear connection, the effective coefficient $k_I$ of pressure-bearing capacity of the pin groove is calculated by $$k_I = \frac{R_e \cdot R_t}{2\gamma_I};$$

$t_m$—thickness of a thicker member or a middle member (mm);
$f_{em}$—standard value of bearing strength of a pin groove of the thicker member or the middle member (N/mm²);
$\gamma_I$, $\gamma_{II}$, $\gamma_{III}$, $\gamma_{IV}$ partial coefficients for resistance of yield modes I, II, III, and IV;
$f_{yk}$—standard value of yield strength for pin type fasteners (N/mm²); and
$k_{ep}$—elastoplastic strengthening coefficient.

11. The design method according to claim 9, wherein in the reconsolidated bamboo beam-column joint, the tenon steel plates are arranged and welded equidistantly to upper left parts of the vertical steel plates, and the reconsolidated bamboo boards are inserted between the tenon steel plates and extend towards the reconsolidated bamboo beam along an axis of the reconsolidated bamboo beam.

12. The design method according to claim 11, wherein in the reconsolidated bamboo beam-column joint, a long side direction of the reconsolidated bamboo boards is parallel to a grain direction of a bamboo, and the reconsolidated bamboo boards are directly attached to the plurality of tenon steel plates and the vertical steel plates.

13. The design method according to claim 12, wherein in the reconsolidated bamboo beam-column joint, an upper surface of the rectangular shear steel plate located at upper ends of the vertical steel plates and a lower surface of the rectangular shear steel plate located at lower ends of the vertical steel plates are flush with upper and lower surfaces of the reconsolidated bamboo beam, and front and rear ends of the rectangular shear steel plates are aligned with edges of the reconsolidated bamboo boards.

14. The design method according to claim 9, wherein in the reconsolidated bamboo beam-column joint, self-tapping screws are arranged on two sides of the mortise of the reconsolidated bamboo column in a direction perpendicular to grain, and the self-tapping screws penetrate a side wall of the reconsolidated bamboo column.

15. The design method according to claim 9, wherein in the reconsolidated bamboo beam-column joint, an end where the mortise of the reconsolidated bamboo beam is located is embedded in the mortise of the reconsolidated bamboo column.

16. The design method according to claim 9, wherein in the reconsolidated bamboo beam-column joint, the rotating portion is arranged at the center of the half tenon; a plurality of bolt holes are evenly distributed in portions, located in the reconsolidated bamboo beam, of the embedded steel plates; and the center of the elliptical bolt hole is horizontally aligned with a center of a bolt hole adjacent to the elliptical bolt hole.

17. The design method according to claim 16, wherein in the reconsolidated bamboo beam-column joint, a short axis of the elliptical bolt hole is as long as a diameter of the bolt hole and perpendicular to an axis of the reconsolidated bamboo beam, and the long axis of the elliptical bolt hole has a length of 3-4 times the diameter of the bolt hole.

\* \* \* \* \*